UNITED STATES PATENT OFFICE.

RUDOLF EHRMANN, OF CHARLOTTENBURG, GERMANY, ASSIGNOR TO THE FIRM OF JOHANN A. WÜLFING, OF BERLIN, GERMANY.

DIGESTIVE MEDICINE.

1,003,347.  Specification of Letters Patent.  Patented Sept. 12, 1911.

No Drawing.  Application filed June 30, 1910. Serial No. 569,704.

*To all whom it may concern:*

Be it known that I, RUDOLF EHRMANN, M. D., a citizen of the Empire of Germany, residing at Charlottenburg, in the Empire of Germany, have invented new and useful Improvements in Digestive Medicines, of which the following is a specification.

As is well known, pepsin only develops its proteolytic action in the presence of acids, especially hydrochloric acid, but it loses in an aqueous hydrochloric acid solution its fermentative power after a short period, probably owing to a process, which may be described as self-consumption.

My invention relates to the production of a permanent preparation from a proteolytic ferment and an acid-albumen.

I will now proceed to describe my invention.

It is already known that permanent hydrochloric acid-pepsin-preparations can be obtained by the mixing of betain hydrochlorid or hydrochlorids of the amino acids with pepsin. The preparations so produced, however, which are soluble in water and are hydrolyzed by the saliva with separation of free hydrochloric acid, can only be taken in an aqueous solution on account of their strongly acid taste.

From experiments hitherto made it would appear to be improbable that hydrochloric acid albumen, neutral to Congo, would suffice for producing a strong albumen digestion by the addition of pepsin powder. I have discovered, that the reaction nevertheless takes place almost the same as in the presence of free hydrochloric acid, which is proved by the following quantitative digestion experiments.

2.0 grams hydrochloric acid albumen were digested in the water bath with an addition of 0.2 gr. pepsin, but without further addition of hydrochloric acid, for 24 hours, after which it was found, that .78 grams of albumen had been digested. When in a parallel experiment hydrochloric acid was added, then .77 grams of albumen were digested. A check experiment gave a similar result. 2.0 grams of hydrochloric acid albumen +6 grams casein were digested with and without addition of hydrochloric acid for 48 hours. Without the addition of hydrochloric acid 3.4 grams, and on repetition of the experiment 3.3 grams of albumen were found to be digested. With the addition of hydrochloric acid 3.7 grams, and on repetition of the experiment 3.1 grams of albumen were found to be digested. The commencement and further proceeding of the digestion was consequently the same, and the hydrochloric acid of the hydrochloric acid albumen had acted just like the added free hydrochloric acid. From these surprising results I have deduced the way for producing an article which 1, contains pepsin in a thoroughly permanent and immediately active condition, and 2, introduces with the pepsin at the same time a certain quantity of a medium extremely well adapted for the ferment, so that for the digestive process ideal conditions are present.

My new product is formed as follows: 80 to 90 parts by weight of hydrochloric acid albumen are mixed with 10 to 20 parts by weight of fine pepsin. Thereby a product is obtained which is insoluble in water and almost tasteless, which can be easily made into tablets and permits of being taken direct.

A suitable hydrochloric acid albumen containing 3.25% of hydrochloric acid can be for example obtained by digesting serum albumen or egg albumen at indoor temperature for about an hour with alcohol of 90% containing hydrochloric acid; the product so formed is filtered and dried.

The permanence of the preparation is proved by the following observations: 2.2 grams of a mixture of hydrochloric acid albumen with 10% of the purest pepsin, which was kept for five weeks at the temperature of the room, were digested for fifteen hours in the water bath with 6 grams of casein, after which it was found, that 2.45 grams of albumen had been digested. On a control experiment with like quantities of freshly prepared mixture of pepsin with albumen, 2.58 grams of albumen were found to be digested.

Instead of hydrochloric acid albumen some other albumen may be used, which is best combined in alcoholic suspension with an acid not injurious to the stomach and which is also in a condition to commence the pepsin digestion, such for instance as lactic acid albumen.

Instead of pepsin, papayotin, which is the proteolytic enzym obtained from the fruits of the melon tree, *carica papaya*, may be used, which, as I have ascertained, develops also in combination with acid albumen an excellent proteolytic action, and especially rapidly attacks compounds which for a long time resist the pepsin digestion. This ferment also forms permanent and active products, when mixed with hydrochloric acid albumen or with lactic acid albumen.

I claim:

1. A digestive medicament consisting of a solid acid-albumen and a proteolytic ferment active in an acid solution.

2. A digestive medicament consisting of a solid acid-albumen and a proteolytic ferment active in an acid solution formed into tablets.

3. A digestive medicament consisting of a solid acid-albumen and pepsin.

4. A digestive medicament consisting of a solid acid-albumen and pepsin formed into tablets.

5. A digestive medicament consisting of hydrochloric acid-albumen and pepsin.

6. A digestive medicament consisting of hydrochloric acid-albumen and pepsin formed into tablets.

7. A digestive medicament consisting of 80–90 parts by weight of hydrochloric acid-albumen and 10–20 parts pepsin.

8. A digestive medicament consisting of hydrochloric acid-albumen and about 10% of pepsin.

In testimony whereof I affix my signature in presence of two witnesses.

RUDOLF EHRMANN.

Witnesses:
HENRY HASPER,
WOLDEMAR HAUPT.

Copies of this patent may be obtained for five cents each, by addressing the "Commissioner of Patents, Washington, D. C."